UNITED STATES PATENT OFFICE.

HARRY BIRCHALL, OF NEW YORK, N. Y., ASSIGNOR OF ONE-HALF TO FRANCIS K. SHEPHERD, OF NEW YORK, N. Y.

PAINT AND VARNISH REMOVER.

1,165,148.  Specification of Letters Patent.  Patented Dec. 21, 1915.

No Drawing.   Application filed March 9, 1915.  Serial No. 13,154.

*To all whom it may concern:*

Be it known that I, HARRY BIRCHALL, a subject of the King of Great Britain, and a resident of the city of New York, borough of Manhattan, in the county and State of New York, have invented a new and Improved Paint and Varnish Remover, of which the following is a full, clear, and exact description.

The object of the invention is to provide a new and improved composition of matter to be used as a paint and varnish remover and which can be cheaply manufactured, is practically odorless and when applied quickly removes paints and varnishes from woodwork, metal structures and other articles and materials.

The composition of matter consists of the following ingredients in about the proportions stated, namely:

| | |
|---|---|
| Alcohol | 5 gallons. |
| Turpentine | 1 gallon. |
| Oil of mirbane (nitrobenzol) | 1 " |
| Acetic acid | ½ " |
| Gum camphor | 2 pounds. |
| Beeswax | 2 " |

In order to produce the composition of matter, I proceed as follows: The camphor is dissolved in the alcohol while contained in one container, and in a separate container is dissolved the wax in the turpentine, after which the oil of mirbane and the acetic acid are added. The two mixtures are then poured into a single container to form the composition of matter.

The oil of mirbane in the composition of matter acts as a restraint to prevent evaporation and it also has a slow penetrating property to aid the alcohol and the gum camphor in dissolving the paint and varnish. The gum camphor and the alcohol are very active solvents of high power to insure a rapid removal of the paint or varnish. The beeswax gives the desired body to the composition.

The composition of matter is applied to the paint or varnish with a brush or with a soft fabric material.

The oil of mirbane and acetic acid, being non-inflammable, render the mixture a reasonably safe one to handle.

Having thus described my invention, I claim as new and desire to secure by Letters Patent:

The herein described composition of matter to be used as a paint and varnish remover, consisting of the following ingredients in about the proportions stated, namely, alcohol, five gallons; turpentine, one gallon; oil of mirbane, 1 gallon; acetic acid, one half gallon; gum camphor, two pounds; and beeswax, two pounds.

In testimony whereof I have signed my name to this specification in the presence of two subscribing witnesses.

HARRY BIRCHALL.

Witnesses:
 THEO. G. HOSTER,
 PHILIP D. ROLLHAUS.